United States Patent
Edatsune et al.

(10) Patent No.: US 6,867,877 B1
(45) Date of Patent: Mar. 15, 2005

(54) PRINTER AND PRINTING METHOD

(75) Inventors: Isao Edatsune, Nagano (JP); Masanori Tanizaki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 156 days.

(21) Appl. No.: 09/630,409

(22) Filed: Aug. 1, 2000

Related U.S. Application Data (63) Continuation of application No. PCT/JP99/06691, filed on Nov. 29, 1999.

(30) Foreign Application Priority Data

Dec. 1, 1998 (JP) .......................... 10-341534

(51) Int. Cl.⁷ .............................. G06F 15/00
(52) U.S. Cl. ................... 358/1.15; 358/540; 715/517; 715/520
(58) Field of Search ................ 358/540, 450, 358/358; 715/517, 518, 519, 520, 511

(56) References Cited

U.S. PATENT DOCUMENTS 5,477,353 A * 12/1995 Yamasaki .................. 358/487
5,706,097 A * 1/1998 Schelling ................... 358/296
6,151,421 A * 11/2000 Yamada ..................... 382/284
6,154,295 A * 11/2000 Fredlund ................... 358/487
6,222,637 B1   4/2001 Ito et al.
6,549,681 B1 * 4/2003 Takiguchi et al. .......... 382/294

FOREIGN PATENT DOCUMENTS

| JP | 6-238958 | 8/1994 | ............ B41J/5/30 |
| JP | 09-269999 | 10/1997 | |
| JP | 9-331444 | 12/1997 | ......... H04N/1/387 |
| JP | 10-305632 | 11/1998 | ............ B41J/21/00 |
| JP | 10-307903 | 11/1998 | ............ G06T/1/00 |

* cited by examiner

Primary Examiner—Kimberly Williams
Assistant Examiner—Saeid Ebrahimi
(74) Attorney, Agent, or Firm—Sughrue Mion, PLLC (57) ABSTRACT

A data acquisition portion 7 acquires any one of the composition data from a frame card in a case where the identifier of the whole file represents composition data and acquires image data from a memory card in a case where the identifier of the whole file represents the attributes of image data. A control portion 3 retrieves from ROM each parameter corresponding to the identifier of the composition data acquired from the frame card. With the parameters, the control portion 3 generates printing data by combining the image data acquired from the memory card with the composition data.

11 Claims, 9 Drawing Sheets

| IDENTIFIER | IMAGE DATA LAYOUT POSITION (UPPER LEFT X-AXIS, UPPER LEFT Y-AXIS, LOWER RIGHT X-AXIS, LOWER RIGHT Y-AXIS) | PRINTING PAPER SIZE | ... |
|---|---|---|---|
| frm. | (10,10,30,40)<br>(40,10,60,40)<br>(70,10,90,40)<br>.........<br>(100,130,120,160) | postcard | ... |
| msg. | (20,20,120,170) | postcard | ... |
| cld. | (50,50,250,350) | A 4 | ... |

Fig. 9

PRINTER AND PRINTING METHOD

This is a continuation of PCT Application No. PCT/JP99/06691, filed Nov. 29, 1999.

TECHNICAL FIELD

The present invention relates to printers and printing methods and more particularly to a printer and a printing method for combining images and printing the resulting composite images.

BACKGROUND ART

With the diffusion of digital cameras in recent years, there have been developed printers capable of printing images according to the data directly transmitted from digital cameras through cables or by reading the data recorded on recording media. Such a printer is capable of printing the images photographed by digital cameras like the photographs developed from a sensitized film.

Moreover, because the images photographed by the digital camera are recorded as electronic data, it is possible to produce New Year's cards or calendars with illustrations of images and letters laid out therein, photographic seals set in frames or the like by processing the images using an image processing application on a personal computer (hereinafter called the PC) and printing the images thus processed.

However, there exists a problem arising from the fact that digital camera users who do not have a PC or are inexperienced in handling a PC are unable to produce printed matter wherein the image photographed together with any other image or letter is laid out through the simple operation of the single prior art printer.

Another problem is that it is still troublesome and takes considerable time to produce printed matter wherein the image photographed together with any other image or letter is laid out because the image thus photographed is processed by using the image processing application on the PC.

An object of the present invention made to solve the foregoing problems is to provide a single printer and a printing method for producing printed matter wherein the image recorded together with any other image or letter by an image recording apparatus such as a digital camera is laid out.

Another object of the present invention is to provide a printer and a printing method for easily producing printed matter wherein the image recorded together with any other image or letter by an image recording apparatus such as a digital camera is laid out.

Still another object of the present invention is to provide a printer and a printing method for producing printed matter in a short time wherein the image recorded together with any other image or letter by an image recording apparatus such as a digital camera is laid out.

DISCLOSURE OF THE INVENTION

A printer according to the present invention comprises composition-file acquisition means, storage means, parameter retrieval means, image-data acquisition means, composition means and printing means. The composition-file acquisition means is used for acquiring any one of the composition files from a first recording medium for recording composition files having composition data for combining any given image with a predetermined image so as to print the composite image, and identification data representing attributes of the composition data. The storage means is used for storing the composition data acquired from the first recording medium. The parameter retrieval means is used for retrieving from a predetermined table parameters corresponding to the identification data acquired from the first recording medium. The image-data acquisition means is used for acquiring at least one image data from a second recording medium for storing given image data. The composition means is used for combining the image data acquired from the second recording medium with the composition data in the storage means so as to generate printing data using the parameters. The printing means is used for printing images on a print medium such as paper according to the printing data. With this printer, printed matter wherein the image recorded together with any other image or letter by an image recording apparatus is laid out can be made with a single printer because the parameters for generating the printing data by combining the composition data and the image data are retrieved by the identification data from the predetermined table. Moreover, printed matter can be made easily in a short time.

Another printer according to the present invention comprises discrimination means, data acquisition means, storage means, parameter retrieval means, composition means and printing means. The discrimination means is used for acquiring the whole identification data from a first recording medium for recording composition files having composition data for combining any given image with a predetermined image so as to print the composite image, and identification data representing attributes of the composition data or from a second recording medium for recording image files having any given image data and identification data representing attributes of the image data. In a case where the whole identification data is identification data representing attributes of composition data, the data acquisition means is used for acquiring any one of the composition data from the first recording medium, whereas in a case where the whole identification data is identification data representing attributes of image data, the data acquisition means is used for acquiring at least one image data from the second recording medium. The parameter retrieval means is used for retrieving from a predetermined table parameters corresponding to identification data of the composition data acquired from the first recording medium. The composition means is used for combining the image data acquired from the second recording medium with the composition data in the storage means using the parameters so as to generate the printing data. The printing means is used for printing images on a print medium such as paper according to the printing data. With this printer, printed matter wherein the image recorded together with any other image or letter by an image recording apparatus is laid out can be made easily with a single printer because the first and second recording media are discriminated from each other by the identification data and because the parameters for generating the printing data by combining the composition data and the image data are retrieved by the identification data from the predetermined table.

As the printer according to the present invention further comprises display means for displaying printing conditions corresponding to the identification data in the composition file obtained from the first recording medium, the user is able to easily produce printed matter wherein the image recorded together with any other image or letter by an image recording apparatus is laid out with a single printer while checking the printing conditions thus displayed. In other words, it is possible to easily identify the size and kind of printing paper necessary for outputting.

A printing method according to the present invention comprises the steps of acquiring a composition file having composition data for combining any given image with a predetermined image so as to print the composite image, and identification data representing attributes of the composition data, and retrieving from a predetermined table parameters corresponding to the identification data. The printing method according to the present invention further comprises the steps of acquiring image data, generating printing data by combining the image data and the composition data using the parameters and printing the image on paper according to the printing data. Consequently, it is possible to easily produce printed matter in a short time wherein the image recorded together with any other image or letter by an image recording apparatus is laid out.

The program recorded on the recording medium of the present invention includes procedures for acquiring composition files having composition data for combining any given image with a predetermined image so as to print the composite image, and identification data representing attributes of the composition data, retrieving from a predetermined table parameters corresponding to the identification data, acquiring image data, generating printing data by combining the image data and the composition data using the parameters, and printing the image on paper according to the printing data. Consequently, it is possible to easily produce printed matter in a short time wherein the image recorded together with any other image or letter by an image recording apparatus is laid out because the parameters for generating the printing data by combining the composition data and the image data are retrieved by the identification data from the predetermined table.

Further, as the program recorded on the recording medium of the present invention includes a procedure for displaying printing conditions corresponding to the identification data in the composition file, the user is able to easily produce printed matter wherein the image recorded together with any other image or letter by an image recording apparatus is laid out with a single printer while checking the printing conditions thus displayed. In other words, it is possible to easily identify the size and kind of printing paper necessary for outputting.

BEST MODE FOR CARRYING OUT THE INVENTION

An embodiment of the present invention will now be described in detail with reference to the drawings.

Figure 1:
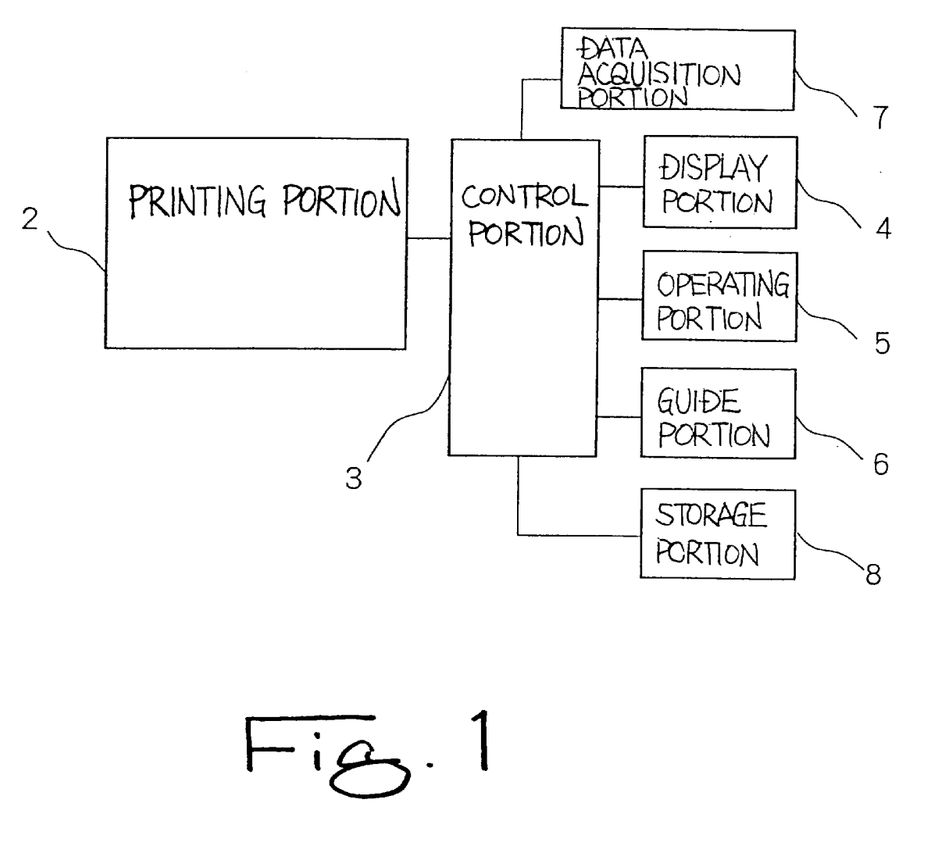
FIG. 1 is a block diagram of a printer embodying the present invention.
Figure 2:
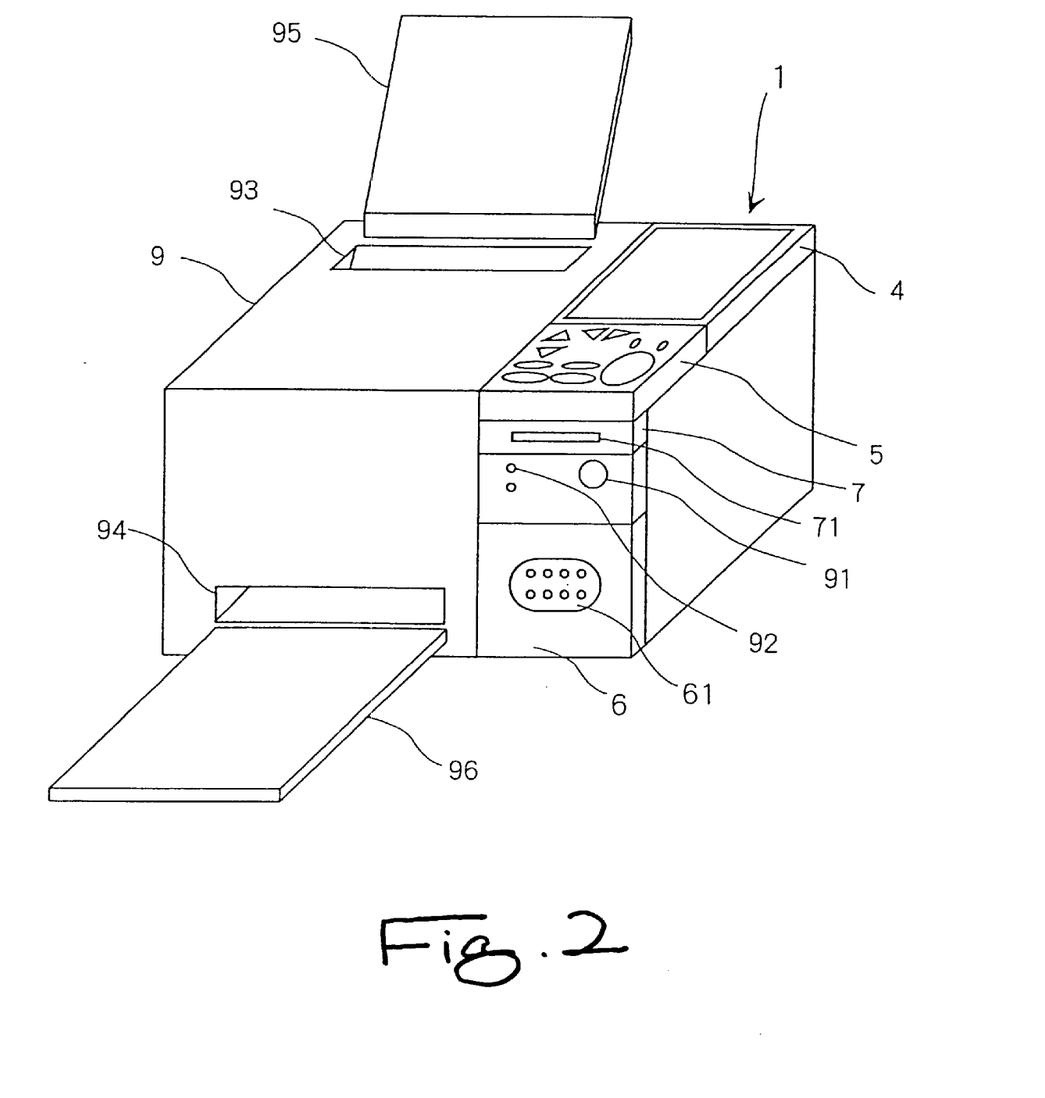
FIG. 2 is a perspective view of the printer according to the embodiment of the present invention.

FIGS. 1 and 2 show a printer embodying the present invention. The printer 1 is designed to produce printed matter through the steps of selectively acquiring and storing a composition file from a frame card such as a memory card where various kinds of composition files are stored in a recording medium, selectively acquiring and storing image data from the recording medium in which the image file recorded by a digital camera is stored and combining composition data and the image data.

The frame card is a memory card of the PCMCIA standard where a plurality of composition files are recorded, each file consisting of composition data and identification data. The image expressed by the composition data includes, for example, a decorative frame of a photographic image, letters and illustrations of a New Year's and a Christmas card on which a photographic image is laid out, and an image with the calendar date when photographic image is laid out on paper of A4. The identification data includes an identifier indicating the kind of data included in the composition file and a frame number of the composition data. Several identifiers are predetermined according to the kind of composition data prepared on the assumption that printing is made with a layout, print size and resolution as predetermined. For example, the identifier of composition data for use in making out sealing paper of postcard size with the same photographic image fitted in a 16-frame of decoration is set as 'frm.'; the identifier of the composition data for making out a New Year's card with the greeting term added below the photographic image is set as 'msg.'; the identifier of the composition data for making out a A4 calendar with the date added below the photographic image is set as 'cld.' and so forth.

The printer 1 shown in FIG. 2 comprises, as shown in FIG. 1, a printing portion 2, a control portion 3, a display portion 4, an operating portion 5, a guide portion 6, a data acquisition portion 7, and a storage portion 8. The printing portion 2, the control portion 3, the display portion 4, the operating portion 5, the guide portion 6, the data acquisition portion 7, and the storage portion 8 are contained in a box-type housing 9 shown in FIG. 2.

As shown in FIG. 2, the display portion 4 and the operating portion 5 are placed on the surface of the housing 9. The data acquisition portion 7, a power supply switch 91, warning lamps 92 for informing the shortage of ink and paper, and the guide portion 6 are installed on the front of the housing 9. Moreover, the printing portion 2, the control portion 3 and the storage portion 8 (these being not shown in FIG. 2) are also installed inside. A paper supply port 93 and a paper discharge port 94 are formed in the surface and in the lower portion of the front of the housing 9, respectively. The paper supply port 93 is detachably fitted with a paper supply tray 95, whereas the paper discharge port 94 is also detachably furnished with a paper discharge tray 96.

The data acquisition portion 7 as a means for acquiring data includes a card slot 71 installed on the upper front of the housing 9, and a reader (not shown) for reading the composition files and image data stored in the recording media and transmitting them to the control portion 3. A memory card of the PCMCIA standard or a compact flash card as a recording medium for use in any ordinal digital camera may be inserted into the card slot 71 together with an adaptor.

Figure 9:
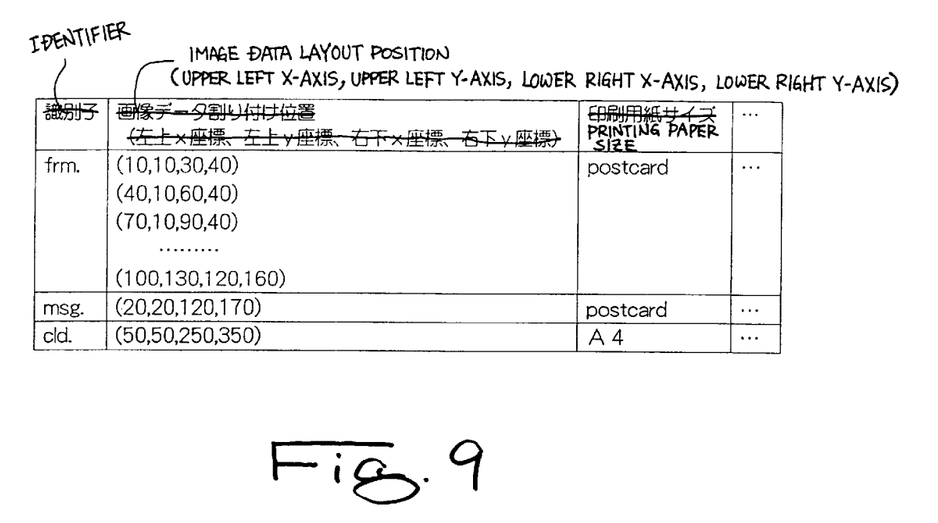
FIG. 9 is an exemplary diagram showing a table for storing parameters in the printer according to the embodiment of the present invention.

The control portion 3 as discrimination and composition means has a CPU (Central Processing Unit) and a ROM (Read Only Memory) with the control program recorded therein. There is also stored a table in the ROM, the table storing predetermined identifiers and a parameter corresponding to each one of the identifiers. In the ROM, a table corresponding to the identifiers 'form.,' '.msg.,' and 'cld.' as exemplified in FIG. 9 is recorded and in this table, there are stored parameters concerning image-data layout positions, printing paper sizes, kinds of printing paper, printing quality and the like. These parameters are used for generating printing data and also displaying printing conditions on the liquid crystal panel of the display portion 4. These parameters are indicated by absolute coordinates representing, for example, positions and sizes at which the image data is laid out on paper or reference signs representing printing paper sizes. These parameters are referred to by the CPU when the composition process is performed, whereby the image processing such as magnification or reduction in size is applied to the image data. Then the image data subjected to the image processing are combined with the composition data. The CPU acquires the whole identification data from the recording medium via the data acquisition portion 7, retrieves a parameter corresponding to the identification data from the table recorded in the ROM, generates printing data that the printing portion 2 interprets and executes by combining the composition data and the image data using the parameter, and stores the printing data in the storage portion 8. Upon receipt of a printing request from the operating portion 5, the CPU controls the printing portion 2 according to the printing data.

The storage portion 8 as a storage means has a RAM (Random Access Memory) for storing the composition file and the image data acquired by the data acquisition portion 7, and the printing data generated by the control portion 3.

Figure 3:
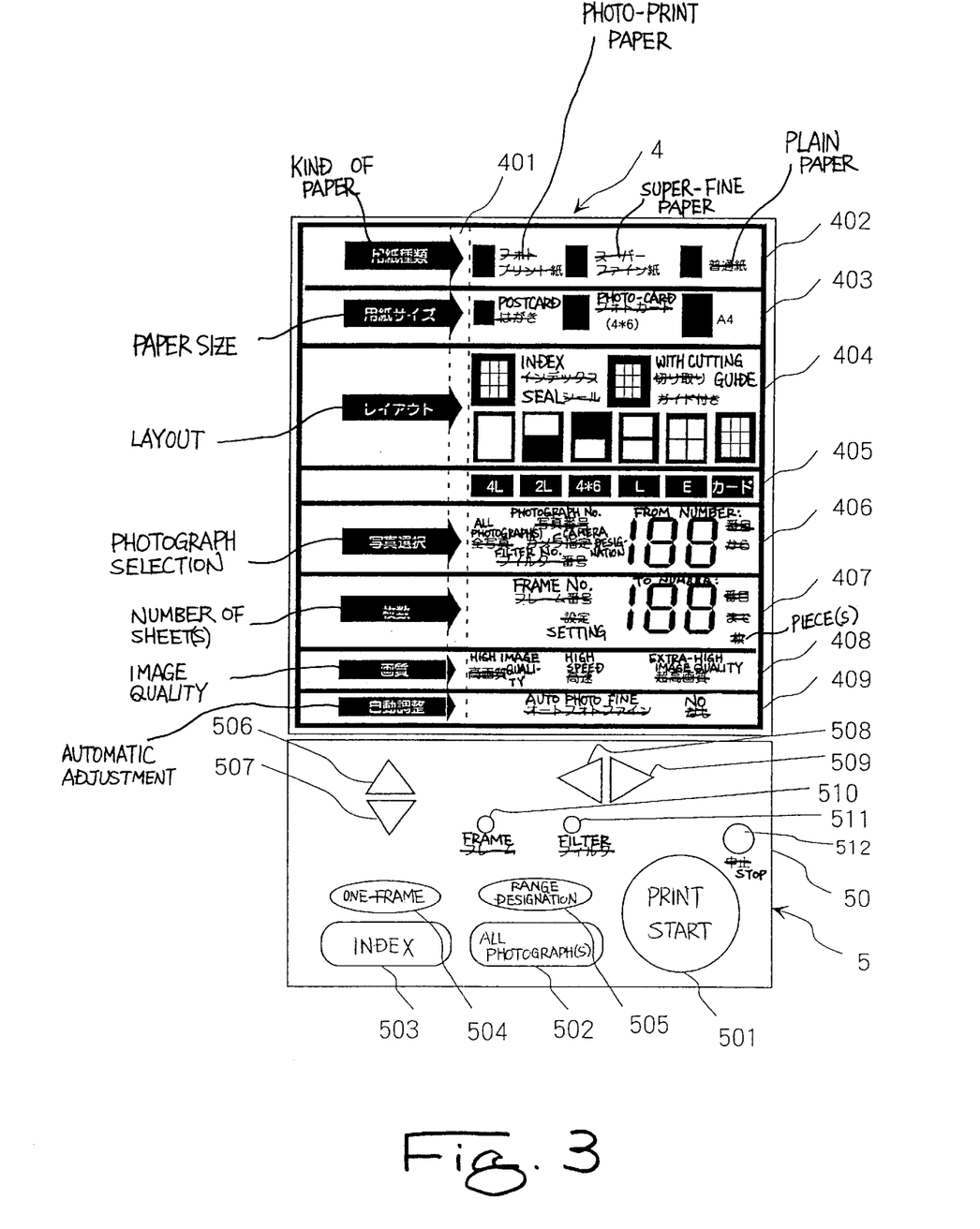
FIG. 3 is a plan view showing an operating and a display portion according to the embodiment of the present invention.

The operating portion 5 is installed on the surface of the housing 9 and as shown in FIG. 3, has various keys on a key panel 50.

A print start key 501 is installed on the side closest to the key panel 50, that is, on a side close to the data acquisition portion 7, and has the external appearance most conspicuous among all the keys, with its operating surface made of transparent material as well as an LED (Light Emitted Diode) inside the transparent material (not shown). This LED is so controlled as to blink when the printing operation is ready to start. When the print start key 501 is depressed, a printing request is transmitted to the CPU.

A full-print key 502 and an index key 503 are installed on this side of the key panel 50 and in parallel to the print start key 501. The full-print key 502 is the second largest key next to the print start key 501, and is rectangular in shape with its corners rounded up. In this case, the operating panel is made of transparent material with each key equipped with an LED (not shown) inside.

A range designation key 505 and a one-frame key 504 are installed in parallel to each other behind the respective full-print key 502 and the index key 503. The range designation key 505 and the one-frame key 504 are oval in shape and a size smaller than the respective full-print key 502 and the index key 503. In this case, the operating panel is also made of transparent material with each key equipped with an LED inside.

The full-print key 502, the index key 503, the range designation key 505 and the one-frame key 504 are those each of which can be selected independently and when any one of the keys is selected, its LED is illuminated. An up- and a down-key 506 and 507 are installed vertically in parallel to each other behind the one-frame key 504, that is, closer to the display portion 4 and triangular with linear symmetry.

A right and a left key 509 and 508 are installed in parallel to each other in a position adjacent to the respective up and down keys 506 and 507 behind the print start key 501 and also triangular with line symmetry. The right or left key 509 or 508 operates to vary the details of printing conditions in each section of the display portion 4.

A frame key 510 and a filter key 511 are installed behind the print start key 501 and also before the right or left key 509 or 508, the frame key 510 and the filter key 511 being the smallest ones.

A suspension key 512 is installed behind the print start key 501 and a size larger than the frame key 510 or the filter key 511. When the suspension key 512 is depressed, the data stored in the RAM is erased and the printing operation is stopped. Then any document being printed is discharged from the paper discharge port 94 with a non-printed blank therein.

The display portion 4 as a display means is installed in a position adjacent to the operating portion 5 on the housing 9. The display portion 9 has a segment-type liquid crystal panel and displays printing conditions including the size and kind of printing paper and so on corresponding to the identifiers. The liquid crystal panel is divided into a selection section 401, a paper kind section 402 for displaying the details of printing conditions, a paper size section 403, a layout section 404, a photography size section 405, a photography selection section 406, a number-of-sheets section 407, an image quality section 408, and an automatic adjustment section 409. FIG. 3 shows a state in which the whole segment of the liquid crystal panel has been lighted.

The selection section 401 selectively displays a section with a triangle by means of the up- and down-keys 506 and 507, and this is a section for making this section active; it is possible to switch between the displays using the right or left key 509 or 508.

The paper kind section 402 is used to switch a paper display from ordinary paper to photo-print paper and superfine paper.

The paper size section 403 is used to switch a paper display from a postcard to a photo-card and A4 paper.

The layout section 404 is used to switch a paper display from full size to the upper row, lower row, division into two parts, division into four parts, indexing and cutting out with guides. When the cutting out with guides is selected, an image can be printed with a register mark.

The photography size section 405 is used to switch a paper display from 4L, 2L, 4×6, L, E and a card. The display in the photography size section is determined by setting the paper size and layout.

The photography selection section 406 is used to switch the total number of identification cords recorded on recording media, and image and composition files recorded thereon from 0 up to 199.

The number-of-sheets section 407 is used to switch the number of composition data recorded on each frame card or that of sheets for printing from 0 up to 199.

The image quality section 408 is used to switch a paper display from high image quality to high speed and extra-high image quality.

The automatic adjustment section 409 is used to switch a paper display without auto photo fine. When the auto photo fine is selected, image data is automatically subjected to image quality adjustment before being printed.

The printing portion 2 includes a carrier roller driven by a motor, a driven roller for carrying paper frictionally by making contact with the carrier roller, a carriage loaded with an ink tank and ink jet heads, a step motor., and a carriage rail installed in a direction perpendicular to the direction of carrying paper, the printing portion 2 being controlled by the CPU. When the carrier roller and the driven roller are rotated, the printing portion 2 carries paper from the paper supply port 93 to the paper discharge port 94 and operates to print images on the paper under any known ink jet method. More specifically, the carriage driven by the step motor in a position opposite to the paper reciprocates on the carriage rail and performs the printing operation by sending a jet of ink in the ink tank from the ink jet head onto the paper. A laser method or an ink impact method may also be applicable to the printing portion 2.

As shown in FIG. 2, the guide portion 6 is installed in the lower front of the housing 9. The guide portion 6 includes a speaker 61 to be driven by the control portion 3, and outputs the voice data read from the ROM.

The operation of the printer 1 will now be described with reference to index printing, frame setting and composition printing modes.

When the power supply switch 91 is turned on, the control program rises up and the guide portion 6 advises the user to insert a card, saying, "please insert the card."

(1) Index printing

Figure 4:
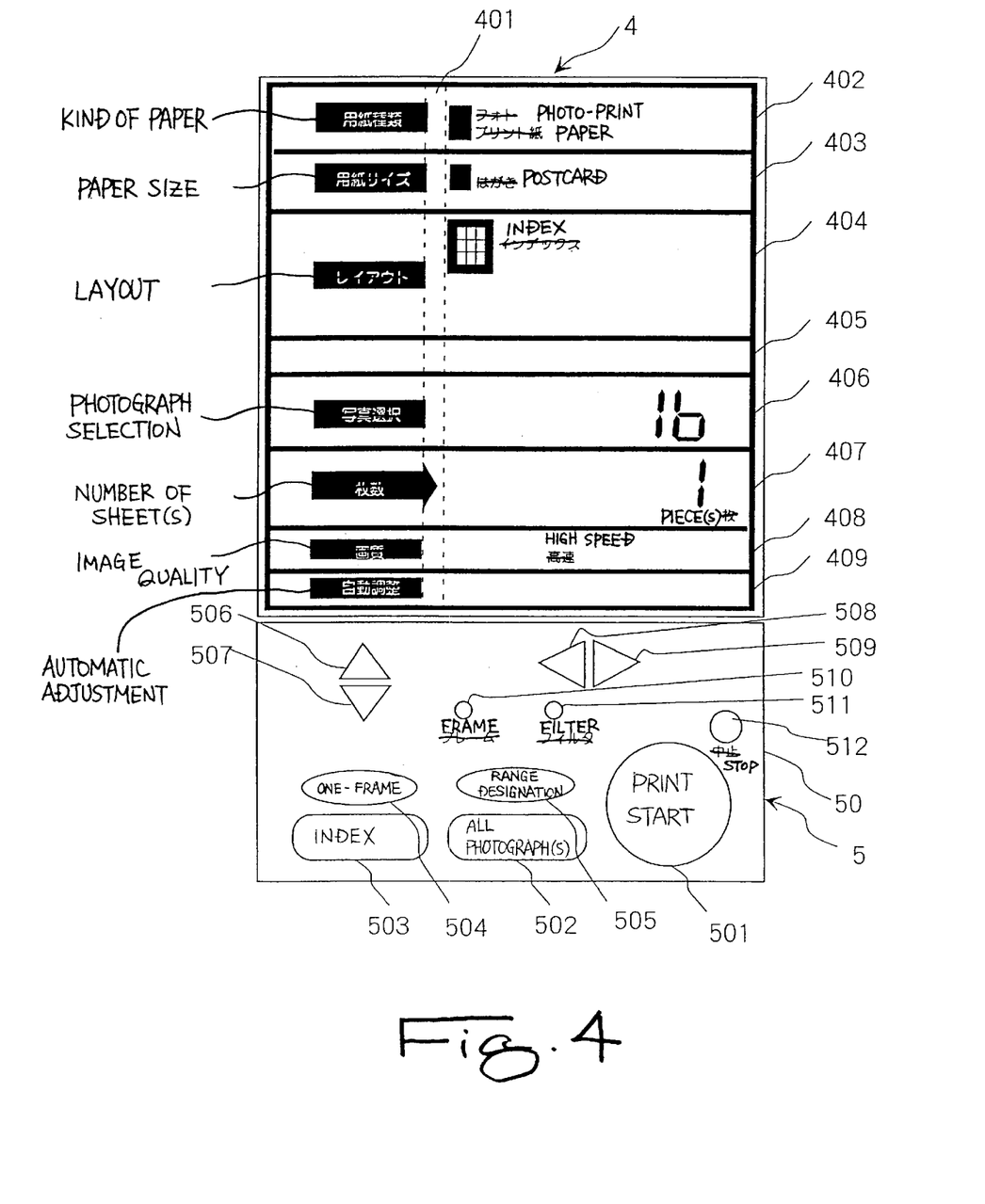
FIG. 4 is a plan view showing the operating and display portions according to the embodiment of the present invention.

When the index key 503 is depressed after the memory card stored with the image file recorded by the digital camera is inserted into the card slot, the index key 503 is lighted. As shown in FIG. 4, the display portion 4 displays, as default setting, photo-print paper in the paper kind section 402, postcard in the paper size section 403, index in the layout section 404, high speed in the image quality section 408, the total number of image files recorded in the memory card in the photography selection section 406, and '1' as the number of sheets to be printed in the number-of-sheets section 407.

When the blinking print start key 501 is depressed, the thumb-nail image data recorded in the whole image file are read out so as to print a 20-frame image having four vertical lines and five horizontal rows per sheet of postcard in size with a photographic number. The speed of reading and printing out the thumb-nail image data is extremely high.

In the index printing, it is possible to print the index of the composition data recorded in the frame card by adding a frame number to the composition image through the same operation as what has been mentioned above. The user is able to easily know the composition data recorded in the frame card by printing the index of the composition data.

(2) Frame setting

When the frame key 510 is depressed, the guide portion 6 advises the user to insert a card, saying, "please insert the card." When the memory or frame card with the photograph recorded thereon is inserted, the CPU inspects the identifier of each image or composition file one after another and discriminates the memory card with the image data recorded thereon from the frame card with the composition file recorded thereon. In a case where the identifier is 'jgp.' representing an image file, for example, the image data is decided to have been recorded in the memory card and the full-print key 502 is lighted, which is followed by an operating mode in which the whole image data is printed one after another. In a case where the whole identifier represents 'form.' or the composition file, the frame card is understood to have been inserted into the card slot 71, so that whether or not the identifier represents one kind of composition file or otherwise a plurality of them.

Figure 5:
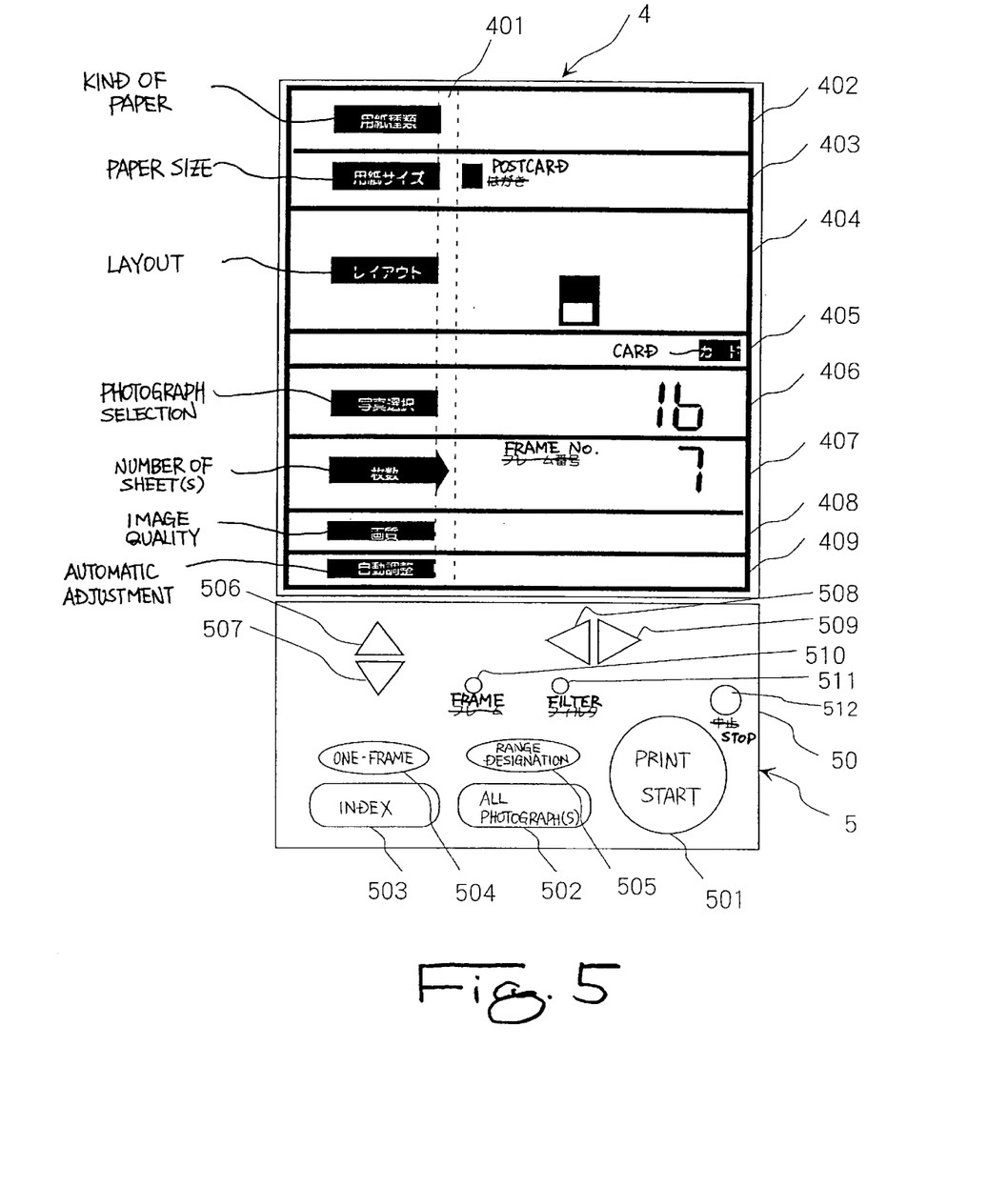
FIG. 5 is a plan view showing the operating and display portions according to the embodiment of the present invention.
Figure 6:
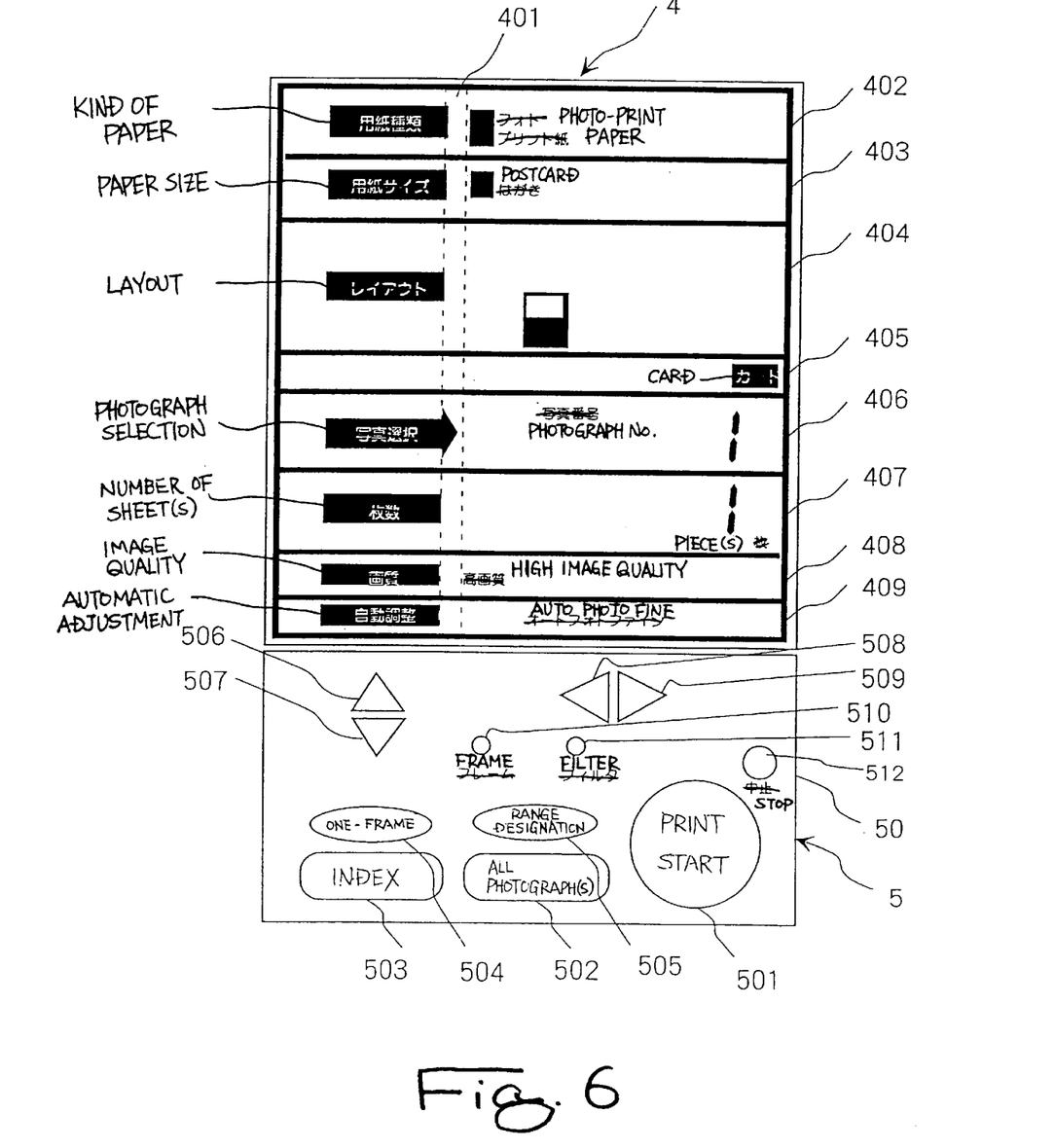
FIG. 6 is a plan view showing the operating and display portions according to the embodiment of the present invention.

(a) In a case where a single kind of image data is represented:

When the identifier is a single identifier, the CPU refers to the ROM table whereby to display, in the display portion 4, the printing conditions corresponding to the identifier. With the identifier being 'msg.' in the display portion 4, for example, there will be displayed a postcard in the paper size section 403, a card in the upper row of the layout section 404 and the photography size section 405, the total number of composition files recorded in the memory card in the photography selection section 406, and 0 in the number-of-sheets section 407. At this time, the number-of-sheets section 407 becomes active. In this state, the frame number of composition data to be combined with image data can be designated by operating the right or left key 509 or 508 in the number-of-sheets section 407 as shown in FIG. 5. When the one-frame key 504 is depressed, the frame number is settled and composition data corresponding to the frame number thus settled is stored in the RAM together with the identifier of the composition data. In a case where the number in the number-of-sheets section 407 is 0 when the one-frame key 504 is depressed, the printing operation is invalidated as any frame is not settled.

Then the composition printing mode is followed and the guide portion 6 advises the user to insert the memory card with the image data recorded therein, saying, "please insert the card with recorded photographs."

(b) In a case where a plurality of composition data exist:

In a case where the identifier is not a single one, the printing conditions are shown in the display portion 4, and the total number of image files recorded in the frame card is displayed in the photography selection section 406. In addition, 0 indicative of the fact that any frame number remains non-selected is displayed in the number-of-sheets section 407. At this time, the number-of-sheets section 407 is active. In this state, the frame number of the composition data combined with the image data may be designated by the right or left key 509 or 508 in the number-of-sheets section 407. When the frame number is designated, the ROM table is referred to by using an identifier corresponding the frame number thus designated whereby to display printing conditions corresponding to the identifier in the display portion 4. When the one-frame key 504 is depressed, the frame number is settled and composition data corresponding to the frame number thus settled together with the identifier of the composition data is stored in the RAM. When the number in number-of-sheets section 407 is 0 after the one-frame key 504 is depressed, the frame number remains unsettled, thus making the operation invalid.

Then the composite print operating mode is followed and the guide portion 6 advises the user to insert the memory card with the image data recorded therein, saying, "please insert the card with recorded photographs."

(3) Composite print:

When the memory card with the image data recorded therein is inserted into the card slot 71, it is possible to select image data to be printed by combining it with the composition data.

At this time, the print start key 501 blinks and the photography selection section 406 becomes active. Then it is possible to designate the photographic number of an image to be printed among the images printed in the index in the photography selection section 406 by operating the right or left key 509 or 508. When the blinking print start key 501 is depressed, the photographic number is settled. Further, image data corresponding to the photographic number is combined with the composition data using the parameters determined by the identifier of the composition data stored in the RAM, so that print data is generated in the RAM.

Figure 7:
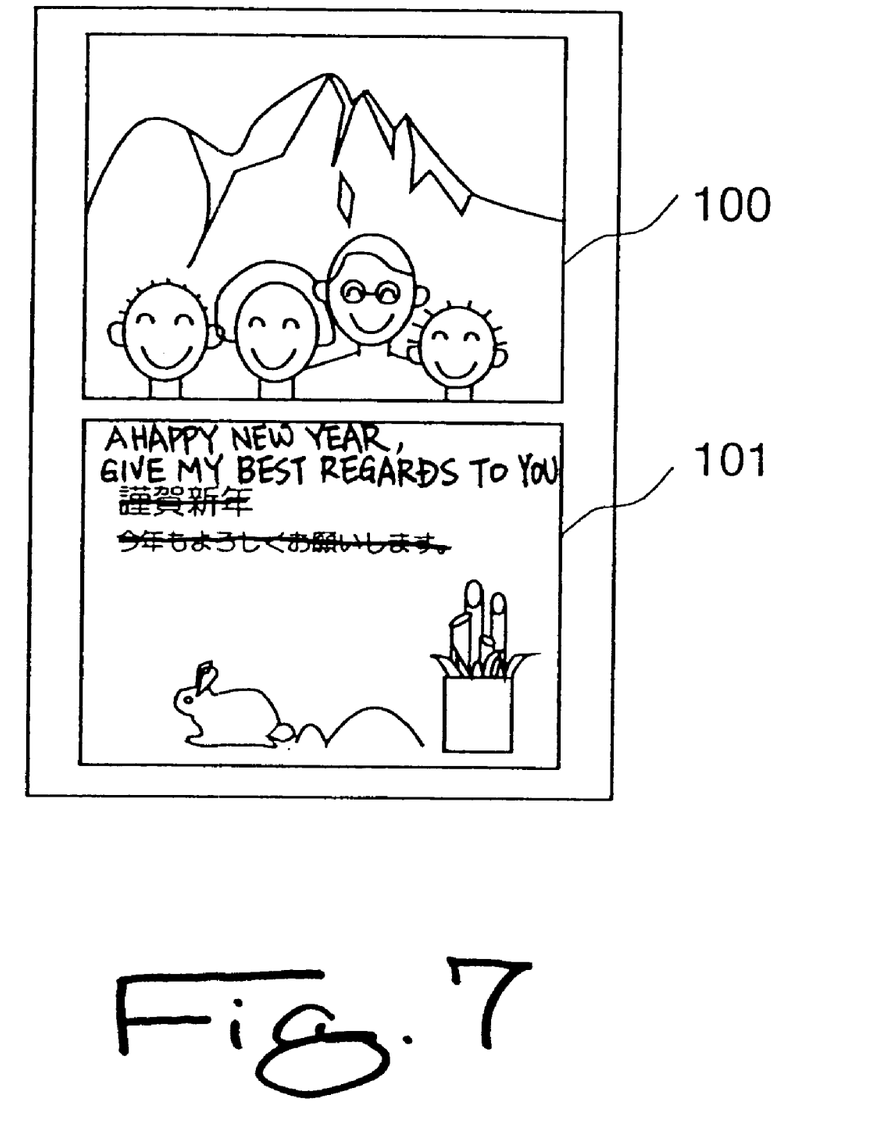
FIG. 7 is an exemplary diagram showing printed matter made by the printer according to the embodiment of the present invention.
Figure 8:
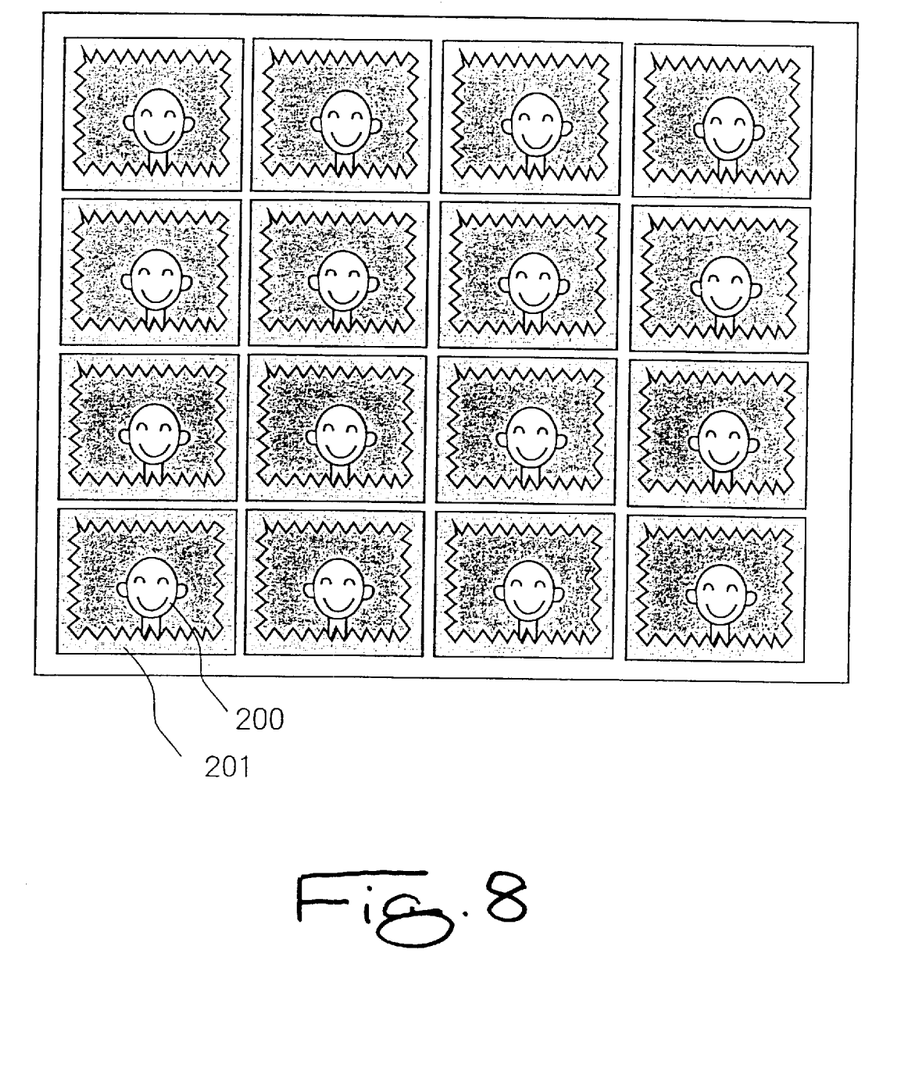
FIG. 8 is an exemplary diagram showing printed matter made by the printer according to the embodiment of the present invention.

When the printing operation is started in the printing portion 2 according to the print data generated in the RAM, printed matter of FIG. 7 is completed by combining an image 100 with letters and an illustration recorded by a digital camera in a case where the identifier stored in the RAM is 'msg.' In a case where the identifier stored in RAM is 'form.' and where the settled kind of composition data is of a 16-frame of photographic decorative image, the photography 200 recorded by a digital camera is combined with the decorative frame to complete printed matter of 16 frames as shown in FIG. 8.

The operation of the printer 1 has been described above.

The printer according to the embodiment of the present invention is capable of setting composition parameters and printing conditions corresponding to predetermined composition data with respect to the image data recorded by a digital camera so as to easily make out printed matter in combination with letters, illustrations, decorative frames and the like using a single printer.

Since printing conditions corresponding to composition data are displayed in the display portion, moreover, the user is allowed to easily know the print paper size and kind needed to be outputted.

Further, desired printed matter can be made out quickly by combining image data with any other image recorded by a digital camera.

Further, the user is able to widely use the digital camera because various processes can be applied to an image without processing any image on the PC.

Although a description has been given of an embodiment of the present invention in the form of combining images and printing the images with a single printer, a printer may be connected to a personal computer, in which case data acquiring means is formed with an input/output interface for receiving data from the PC.

What is claimed is:

1. A printer characterized by comprising:
    composition-file acquisition means for acquiring any one of the composition files from a first recording medium for recording composition files, wherein each of the composition files comprises both composition data and identification data, wherein the composition data is for combining any given image with a predetermined image so as to print the composite image, and wherein the identification data represents attributes of the composition data corresponding to the identification data;
    storage means for storing composition data acquired from said first recording medium;
    parameter retrieval means for retrieving from a predetermined table parameters corresponding to identification data acquired from said first recording medium;
    image-data acquisition means for acquiring at least one image data which comprise said any given image from a second recording medium for storing given image data;
    composition means for combining the image data acquired from said second recording medium with the predetermined image of the composition data in said storage means so as to generate printing data using said parameters; and
    printing means for printing images on a print medium according to said printing data.

2. A printer characterized by comprising:
    discrimination means for acquiring the whole identification data from a first recording medium for recording composition files, wherein each of the composition files comprise both composition data and identification data, wherein the composition data is for combining any given image with a predetermined image so as to print the composite image, and wherein the identification data represents attributes of the composition data corresponding to the identification data, or from a second recording medium for recording image files having any given image data and identification data representing attributes of the image data,
    data acquisition means, wherein, in a case where the whole identification data is identification data representing attributes of composition data, said data acquisition means is used for acquiring any one of the composition data from said first recording medium, whereas in a case where the whole identification data is identification data representing attributes of image data, said data acquisition means is used for acquiring at least one image data which comprises said any given image from said second recording medium;
    storage means for storing the composition data acquired from said first recording medium and the image data acquired from said second recording medium;
    parameter retrieval means for retrieving from a predetermined table parameters corresponding to identification data of the composition data acquired from said first recording medium;
    composition means for combining the image data acquired from said second recording medium with the the predetermined image of the composition data in the storage means using the parameters so as to generate the printing data; and
    printing means for printing images on a printing medium according to said printing data.

3. A printer as claimed in claim 1, characterized by comprising display means for displaying printing conditions corresponding to the identification data on the composition file acquired from said first recording medium.

4. A printer as claimed in claim 2, characterized by comprising display means for displaying printing conditions corresponding to the identification data on the composition file acquired from said first recording medium.

5. A printing method characterized by comprising:
    a step of acquiring a composition file, wherein the composition file comprises both composition data and identification data, wherein the composition data is for combining any given image with a predetermined image so as to print the composite image, and wherein the identification data represents attributes of the composition data corresponding to the identification data;
    a step of retrieving from a predetermined table parameters corresponding to said identification data;
    a step of acquiring image data which comprises said any given image;
    a step of combining said image data the predetermined image of the with composition data so as to generate printing data using said parameters; and
    a step of printing for images on a printing medium according to said printing data.

6. A computer readable medium having a program stored thereon for making a computer execute procedures of:

acquiring a composition file, wherein the composition file comprises both composition data and identification data, wherein the composition data is for combining any given image with a predetermined image so as to print the composite image, and wherein the identification data represents attributes of the composition data corresponding to the identification data;

retrieving from a predetermined table parameters corresponding to said identification data;

acquiring image data which comprises said any given image;

combining said image data with the predetermined image of the composition data so as to generate printing data using said parameters; and printing for images on a printing medium according to said printing data.

7. A computer readable medium as claimed in claim 6 comprising a procedure of displaying printing conditions corresponding to the identification data on said composition file thus acquired.

8. The printer of claim 1, wherein the composition data and the identification data have a one-to-one correspondence.

9. The printer of claim 2, wherein the composition data and the identification data have a one-to-one correspondence.

10. The printing method of claim 5, wherein the composition data and the identification data have a one-to-one correspondence.

11. The computer readable medium of claim 6, wherein the composition data and the identification data have a one-to-one correspondence.

* * * * *